Figure 1:
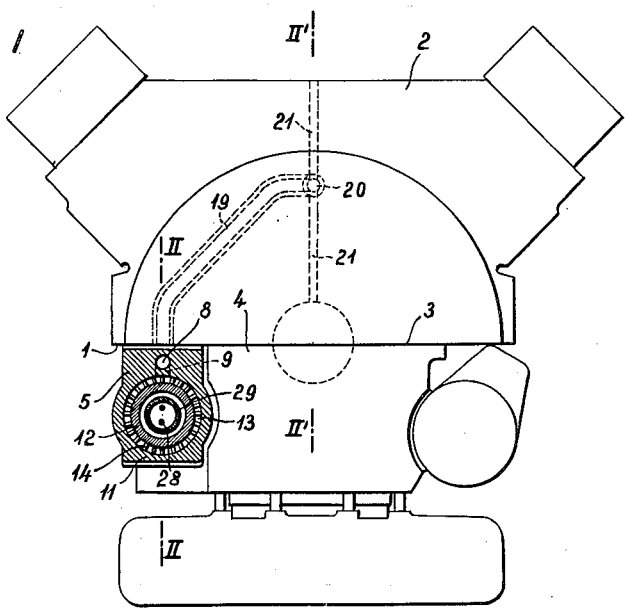

Dec. 30, 1952  A. SCHEITERLEIN  2,623,612
INTERNAL-COMBUSTION ENGINE WITH LUBRICATING OIL COOLER
Filed Oct. 5, 1950

INVENTOR:
Andreas Scheiterlein,
BY Singer, Stein
& Carlberg,
ATTORNEYS.

Patented Dec. 30, 1952

2,623,612

UNITED STATES PATENT OFFICE 2,623,612

INTERNAL COMBUSTION ENGINE WITH LUBRICATING OIL COOLER

Andreas Scheiterlein, Graz, Austria, assignor to Gräf & Stift Automobilfabrik-Aktiengesellschaft, Vienna, Austria Application October 5, 1950, Serial No. 188,625
In Austria October 7, 1949

6 Claims. (Cl. 184—104)

1

This invention relates to an internal combustion engine with lubricating oil cooler and consists substantially in this, that the machined jointing surface of one of the halves of the engine casing which is divided horizontally approximately at the level of the crank shaft projects beyond the other half and that the lubricating oil cooler is connected to this projecting jointing surface without the use of any connecting pipes, the contacting surfaces of lubricating oil cooler and engine casing having coinciding openings for the passage of lubricating oil and cooling water. In this way pipes within the lubricating oil circuit and pipe connections which may give rise to trouble are entirely avoided, whilst pipes for the circulation of cooling water are eliminated. The lubricating oil circuit and the conveyance of the cooling water will thus follow the shortest paths within the engine casing or the engine itself. The invention provides the further advantage, that no separate machining of the engine casing for the connection of the lubricating oil cooler is required, as the latter is connected to the dividing surface of the engine casing, which has in any case to be machined. Even if the surface to be machined will be consequently somewhat larger than usual, such an objection may be practically disregarded, as it is the same surface which is machined with one mounting and one tool setting. A further advantage of the invention resides in the advantageous positioning of the lubricating oil cooler. This advantage is particularly striking in the case of engines with the cylinders in V-formation, in which the lubricating oil cooler arranged in accordance with the invention in no way extends beyond the overall width of the engine determined by the engine cylinders. In such V-engines the lubricating oil cooler is preferably flanged to the jointing surface of the upper half of the casing.

The necessity of having pipes between lubricating oil cooler and lubricating oil filter may also be entirely avoided by giving the lubricating oil filter the form of a cover which closes one end face of the lubricating oil cooler. According to the invention the lubricating oil cooler may be constructed so as to comprise a heating device, preferably an electric heating body mounted in the water space of the lubricating oil cooler, so that, on starting up, when the lubricating oil is still viscous, the oil is heated and thus the dangerous period for the engine, during which the lubrication is detrimentally affected by the high viscosity of the oil, can be greatly reduced.

Figure 2:
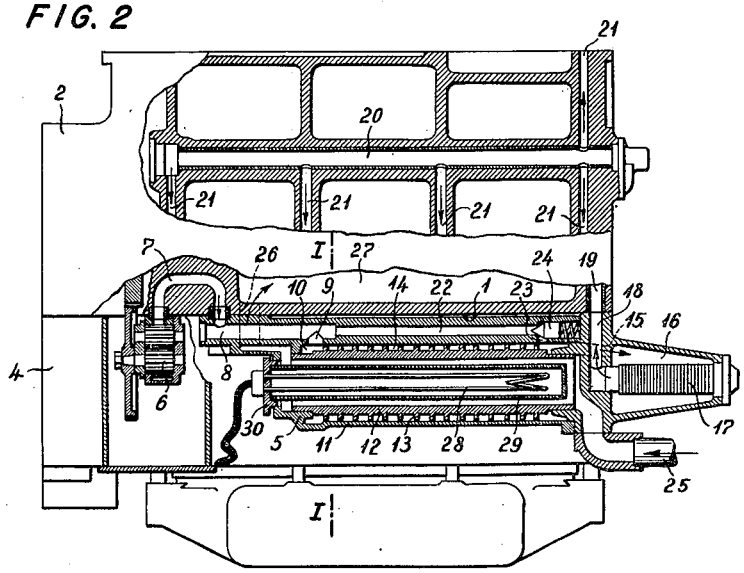

A constructional example of the invention is diagrammatically illustrated in the accompanying drawing, in which Fig. 1 shows an end view of a diesel engine with the cylinders arranged in V-formation, the lubricating oil cooler being in section on line I—I of Fig. 2 and Fig. 2 a side elevation of the engine, the lower part of the casing being in section on line II—II and the upper part in section on line II—II of Fig. 1.

The engine casing is horizontally divided approximately at the level of the crank shaft, the jointing surface 1 of the upper half 2 of the casing projecting laterally beyond the jointing surface 3 of the lower half 4 of the casing. The oil cooler 5 is in close contact with the jointing surface 1.

The lubricating oil is conveyed to the lubricating oil cooler by a gear wheel type pump 6, also connected to the jointing surface 1, through a conduit 7 provided in the half 2 of the casing. From the conduit 7 the lubricating oil passes by way of a bore 8 of the lubricating oil cooler and an aperture 9 into the space 10 between the outer wall 11 of the lubricating oil cooler and a gilled pipe 12 containing the cooling water. The gills 13 of the gilled pipe 12 have slots 14, through which the oil can flow. The lubricating oil cooled in this manner passes through a duct 15 into the space 16 of the lubricating oil filter which shuts off one end face of the lubricating oil cooler in the manner of a cover. After passing through the filter 17 the cooled and purified oil, the direction of flow of which is indicated by arrows, passes by way of a bore 18 and a conduit 19 of the engine casing 2 to a collecting duct 20, from where it is conveyed through ducts 21 to the various lubricating points.

At low temperatures the resistance to flow through the lubricating oil cooler is very great, thus causing an inadmissible rise in pressure in the lubricating oil cooler and a throttling of the flow of lubricating oil. For this purpose a short-circuiting duct 22, 23 is provided, which is closed by a spring loaded valve 24, so that on the closing pressure of the valve 24 being exceeded, the oil delivered by the gear wheel pump 6 can be conveyed to the filter 17, by-passing the lubricating oil cooler.

The cooling water is conveyed through a pipe 25 from the water re-cooler to the interior of the gilled pipe 12 and passes at the other end of the lubricating oil cooler through a duct 26 into the cooling water space 27 of the engine. Into the water space of the gilled pipe 12 an electric heating body 29 which is heated by a heating coil 28 can be inserted. This heating body 29 is provided with a flange 30 which can be placed in a simple manner as a cover on one end of the oil cooler, so as to form a closing cover. This electric heating body enables the lubricating oil flowing through the oil cooler to be heated up during the starting period, so as to reduce the excessive viscosity of the oil at low temperatures.

What I claim is:

1. In a water cooled internal combustion engine having a cooling water jacket, a crank case comprising an upper member integral with the engine and a bottom member secured to said upper member, interengaging surfaces on said upper and lower members, an extension of said upper surface on the outside of the crank case, an oil cooler, a flat surface on said oil cooler for engagement with said extension surface on the upper crank case member, means for securing said oil cooler to said upper crank case member, a lubricating oil space in said oil cooler, a cooling water space in said oil cooler, conduit means in said upper crank case member connecting said lubricating oil space to a pump, other conduit means in said upper crank case member connecting said cooling water space with the cooling water jacket of the engine, and still other conduit means in said oil cooler connecting said cooling water space with a source of cooling water.

2. An internal combustion engine as set forth in claim 1 including two rows of cylinders in V-formation.

3. An internal combustion engine as set forth in claim 1 including an end cover on one end of said lubricating oil cooler, and oil filtering means in said end cover.

4. In a water cooled internal combustion engine having a cooling water jacket, a crank case comprising an upper member integral with the engine and a bottom member secured to said upper member, interengaging surfaces on said upper and lower members, an extension of said upper surface on the outside of the crank case, an oil cooler, a flat surface on said oil cooler for engagement with said extension surface on the upper crank case member, means for securing said oil cooler to said upper crank case member, a lubricating oil space in said oil cooler, a cooling water space in said oil cooler, conduit means in said upper crank case member connecting said lubricating oil space to a pump, other conduit means in said upper crank case member connecting said cooling water space with the cooling water jacket of the engine, still other conduit means in said oil cooler connecting said cooling water space with a source of cooling water, and heating means in said lubricating oil cooler.

5. An internal combustion engine as set forth in claim 4 in which said heating means comprises an electric heater disposed in said cooling water space in said lubricating oil cooler.

6. An internal combustion engine as set forth in claim 4, electric heating means in the cooling water space of said lubricating oil cooler, and an end flange on said heating means, said end flange forming an end cover for said lubricating oil cooler.

ANDREAS SCHEITERLEIN.

REFERENCES CITED

The following references are of record in the file of this patent:

UNITED STATES PATENTS

| Number | Name | Date |
|---|---|---|
| 1,197,121 | Herr | Sept. 5, 1916 |
| 1,781,840 | Hannegan | Nov. 18, 1930 |
| 2,134,161 | Watson | Oct. 25, 1938 |
| 2,165,909 | Spiller | July 11, 1939 |